Aug. 25, 1925.

A. STEINLE

ANGULOMETER

Filed May 15, 1922

Inventor:
Adolf Steinle

Patented Aug. 25, 1925.

1,550,755

UNITED STATES PATENT OFFICE.

ADOLF STEINLE, OF JENA, GERMANY, ASSIGNOR TO THE FIRM OF CARL ZEISS, OF JENA, GERMANY.

ANGULOMETER.

Application filed May 15, 1922. Serial No. 561,204.

*To all whom it may concern:*

Be it known that I, ADOLF STEINLE, a citizen of the German Empire, and residing at Jena, Germany, have invented a new and useful Angulometer, of which the following is a specification.

The present invention relates to angulometers, consisting of two hingedly connected rulers which are both disposed laterally of the axis of the joint. The object of the improvements furnished by the invention is to be able to also use such angulometers for the exact measurement of small angles and to attain, even under unfavourable conditions of illumination, both a convenient and exact reading of the angle measured. In order that small angles may be exactly measured, it is necessary that even in the case of the rulers being almost parallel the measuring edges of both rulers may be used on their full length which is not the case in the angulometers hitherto known. According to the invention this is attained by imparting to the two rulers approximately the same distance from the axle of link, viz, to the one ruler with the edge facing the joint and to the other with the edge turned away from the joint. Even with small angles this construction admits of laying the measuring edges on their full length against the object to be measured and of thus attaining an exact transmission of the angle. In order that the measurement may also be extended into the vertex of the angle it is advisable to connect the joint-head of the first-mentioned ruler, in which the edge facing the joint has the same distance as above, to the ruler in such a way that on the side facing the joint the edge open to the measurement approximately extends as far as the perpendicular dropped thereon from the centre of the joint, i. e. that the joint-head is only fixed to the ruler beyond the said perpendicular.

Figure 1:
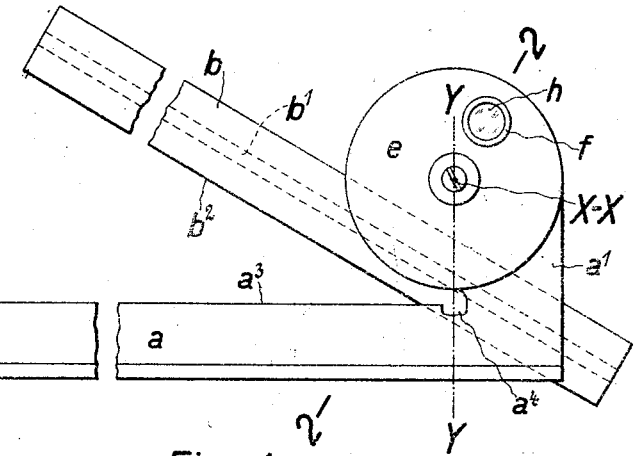
Figure 2:
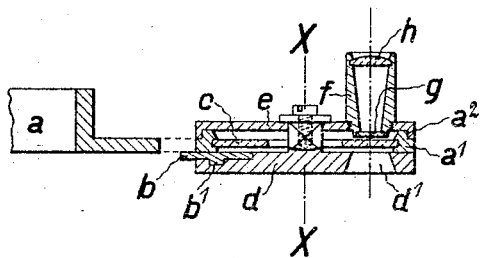
Figure 3:
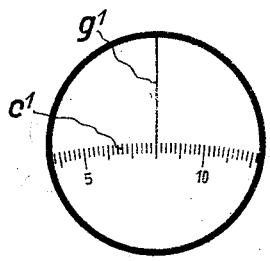

The annexed drawing shows an angulometer provided with a reading magnifying lens according to the invention. Fig. 1 is a front view of the device, Fig. 2 is a cross-section in the direction of the axis of the joint on the line 2—2 of Fig. 1; Fig. 3 shows the field of view presented by the magnifying lens.

Two rulers $a$ and $b$ are rotatably connected by a joint having the axis X—X. The ruler $a$ has an angular cross-section and possesses at its one end a lateral extension $a^1$ which forms a flat ring, centric with the axis of the joint X—X. Into the ring $a^1$ there is rigidly inserted a round glass disc $c$ having at the centre an opening and being provided in its full extension with a scale $c^1$. The ruler $b$ has a flat cross-section and is displaceably disposed in its longitudinal direction relatively to the joint. For this purpose it is provided along the one of its sides with a guide bar $b^1$, by means of which the ruler is guided along the edge of a round disc $d$ having a corresponding groove to receive said bar. The disc $d$ together with the ruler $b$ guided therein is in contact with the one side of the annular extension $a^1$ and is fixed by a disc $e$, rigidly connected to it and contacting with the other side of the extension $a^1$. The disc $e$ somewhat overlaps by its edge a recess $a^2$ of the extension $a^1$, thus forming the joint-guide for the disc $d$ and the ruler $b$ connected therewith. Opposite an opening $d^1$ in the disc $d$, the disc $e$ carries a tube $f$ into which there is fitted close above the glass disc $c$ a divided disc $g$ having a reading line $g^1$, and at the other end a magnifying lens $h$. Hence, by holding the angulometer against the light, both the scale $c^1$ and the appertaining index $g^1$ can be seen in the field of view of the magnifying lens. The distance of the edge $b^2$, turned away from the joint of the ruler $b$ from the axis of the joint X—X is the same as the distance of the edge $a^3$, facing the link, of the ruler $a$ from the axis X—X, so that in the case of small angles the two measuring edges $a^3$ and $b^2$ of the rulers may be used on their full length. The extension $a^1$ of the ruler $a$, forming the joint-head, is so devised that the measuring edge $a^3$ extends almost as far as the perpendicular (denoted in the drawing by Y—Y), dropped thereon from the axis of the joint X—X. In the vicinity of the perpendicular there is a small excavation $a^4$ enabling the user, when measuring small angles, to introduce the object to be measured right into the vertex of the angle.

I claim:

1. Angulometer, comprising two rulers, two joint-heads coacting with each other so as to form a joint, and means adapted to connect each of the rulers with its corresponding joint-head, the said two rulers being disposed laterally of the axis of the joint in such a manner that the edge of the one facing the joint and that of the other facing away from the joint are approximately equidistant from the said axis of the joint, the means connecting the first mentioned ruler with its joint-head lying on the one side of the perpendicular dropped from the centre of the joint to the said edge of this ruler, while the ruler itself lies on the other side of this perpendicular.

2. Angulometer, consisting of two rulers having a joint-head each, these two joint-heads coacting with each other so as to form a joint, a transparent disc fitted to the one of these rulers, a scale traced on this disc, an index fitted to the other ruler, and a magnifying lens, disposed in front of the said disc, the said two rulers being disposed laterally of the axis of the joint in such a manner that the edge of the one facing the joint and that of the other facing away from the joint are approximately equidistant from the said axis of the joint.

ADOLF STEINLE.